United States Patent
Greszta-Franz et al.

(10) Patent No.: US 7,148,374 B2
(45) Date of Patent: Dec. 12, 2006

(54) ELIMINATION-FREE POWDER COATING CROSSLINKING AGENTS

(75) Inventors: Dorota Greszta-Franz, Düsseldorf (DE); Christoph Gürtler, Köln (DE); Reinhard Halpaap, Odenthal (DE); Michael Schelhaas, Köln (DE); Michael Grahl, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 554 days.

(21) Appl. No.: 10/738,729

(22) Filed: Dec. 17, 2003

(65) Prior Publication Data

US 2004/0133035 A1 Jul. 8, 2004

(30) Foreign Application Priority Data

Dec. 20, 2002 (DE) ................. 102 60 300

(51) Int. Cl.
*C07C 265/00* (2006.01)
*C04B 9/02* (2006.01)

(52) U.S. Cl. .................... 560/330; 106/14.42

(58) Field of Classification Search ........ None
See application file for complete search history.

(56) References Cited

U.S. PATENT DOCUMENTS

| | | | |
|---|---|---|---|
| 3,640,947 A | 2/1972 | König et al. | 260/77.5 |
| 3,748,329 A | 7/1973 | Liebsch et al. | 260/244 R |
| 3,752,793 A | 8/1973 | Arlt et al. | 260/78.5 T |
| 3,822,240 A | 7/1974 | Schmitt et al. | 260/77.5 TB |
| 3,935,138 A | 1/1976 | Wingler et al. | 260/17 R |
| 4,044,171 A | 8/1977 | Muller et al. | 427/27 |
| 4,212,962 A | 7/1980 | Schmitt et al. | 528/45 |
| 4,354,014 A | 10/1982 | Wolf et al. | 528/45 |
| 4,463,154 A | 7/1984 | Disteldorf et al. | 528/45 |
| 4,900,800 A | 2/1990 | Halpaap et al. | 528/66 |
| 5,310,577 A | 5/1994 | Mase et al. | 427/164 |
| 5,596,066 A | 1/1997 | Laas et al. | 528/73 |
| 5,847,044 A | 12/1998 | Laas et al. | 524/590 |
| 5,914,383 A | 6/1999 | Richter et al. | 528/59 |
| 2003/0078450 A1 | 4/2003 | Kocher et al. | 560/26 |
| 2003/0232199 A1 | 12/2003 | Rische et al. | 428/423.1 |
| 2003/0232907 A1 | 12/2003 | Rische et al. | 524/195 |
| 2003/0232953 A1 | 12/2003 | Gurtler et al. | 528/45 |
| 2004/0030086 A1 | 2/2004 | Schelhaas et al. | 528/45 |

FOREIGN PATENT DOCUMENTS

| | | |
|---|---|---|
| DE | 1 768 313 | 4/1971 |
| DE | 32 32 463 | 3/1984 |
| EP | 1 063 251 | 10/2003 |
| FR | 1379974 | * 1/1964 |
| GB | 947973 | 1/1964 |
| GB | 954179 | 4/1964 |
| WO | 00/34355 | 6/2000 |

OTHER PUBLICATIONS

J. Prakt. Chem., 336 (month unavailable) 1994, pp. 185-200, Hans Josef Laas, Reinhard Halpaap und Josef Pedain, "Zur Synthese aliphatischer Polyisocyanate—Lackpolyisocyanate mit Biuret-, Isocyanurat- oder Uretdionstruktur".

Angew. Chem., 72, Dec. 1960, pp. 927-934, Dr. H. Meerwein, Dr. D. Delfs und Dr. H. Morschel, "Die Polymerisation des Tetrahydrofurans".

* cited by examiner

*Primary Examiner*—Paul A. Zucker
(74) *Attorney, Agent, or Firm*—Joseph C. Gil

(57) ABSTRACT

The present invention relates to novel blocked, elimination-free polyurethane (PUR) crosslinking agents, to a process for their preparation and to their use as starting components for the production of polyurethane plastics, especially as crosslinking agents for thermally crosslinkable powder coatings.

12 Claims, No Drawings

ELIMINATION-FREE POWDER COATING CROSSLINKING AGENTS

CROSS REFERENCE TO RELATED PATENT APPLICATION

The present patent application claims the right of priority under 35 U.S.C. §119 (a)–(d) of German Patent Application No. 102 603 00.6, filed Dec. 20, 2002.

FIELD OF THE INVENTION

The present invention relates to novel blocked, elimination-free polyurethane (PUR) crosslinking agents, to a process for their preparation and to their use as starting components for the production of polyurethane plastics, especially as crosslinking agents for thermally crosslinkable powder coatings.

BACKGROUND OF THE INVENTION

PUR powder coatings, whose development received a considerable boost in the seventies, consist for the most part of organic polyhydroxyl compounds and blocked polyisocyanates (cf. e.g. DE-A 2 105 777, EP-A 23 023). Binders that are solid at room temperature represent valuable coating systems which almost achieve the flow properties of liquid PUR surface coatings and are equivalent as regards the remaining properties. The disadvantage of these systems is that, during thermal crosslinking, at least part of the blocking agents is released, causing both environmental pollution (VOC) and troublesome deposits in stove furnaces.

This disadvantage was overcome with the development of uretdione-based powder coating crosslinking agents free of blocking agents. The preparation and use of uretdione-containing powder coating crosslinking agents is described e.g. in DE-A 2 420 475 or EP-A 45 998. With these crosslinking agents, curing takes place via a thermal recleavage of the uretdione into free isocyanate groups and their subsequent reaction with a hydroxy-functional binder, this process requiring stoving temperatures above 180° C. For a long time, uretdione crosslinking agents could therefore only be used for heat-resistant substrates. Furthermore, their use was also unfavourable on economic grounds (high energy costs because of the high stoving temperatures required).

Catalyzed uretdione systems that allow crosslinking at lower temperatures have also been published recently. EP-A 803 524 described 1,5-diazabicyclo[4.3.0]non-5-ene (DBN) as a catalyst for uretdione crosslinking at 150° C. In powder coatings conventionally used in practice, however, this catalyst causes intense yellowing. According to the teaching of WO 00/34355, uretdione powder coatings in the presence of zinc acetylacetonate as catalyst already achieve adequate crosslinking after 30 minutes at 130° C., but only with the addition of another powder coating crosslinking agent such as triglycidyl isocyanurate (TGIC).

Elimination-free powder coating crosslinking agents are described e.g. in DE-A 2 144 643 and DE-A 2 328 013. These are systems based on 2,2'-(1,4-phenylene)bis(2-oxazoline), which can be obtained by reacting aromatic dicarboxylic acids with ethanolamine to give oxazolines. A polyesterpolyamide is obtained from this structure by nucleophilic attack with polyols. It is to be regarded as a great disadvantage of this system that such surface coating systems yellow very intensely on overstoving and hence are unusable for higher-quality applications.

On the other hand, powder coating crosslinking agents based on blocked polyisocyanates which have lower crosslinking temperatures and can be cured to form optically perfect coatings without elimination of the blocking agent are not yet known.

SUMMARY OF THE INVENTION

The present invention is directed to organic polyisocyanates that have a melting range within the temperature range of from 40° C. to 125° C., and include NCO groups blocked with one or more CH-acidic cyclic ketones of general formula (I):

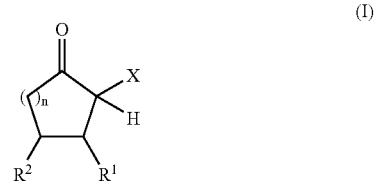

where X is an electron-withdrawing group, $R^1$, and $R^2$ are independently of one another are a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and are optionally substituted by halogen atoms, and n is an integer from 0 to 5.

The present invention is also directed to a process of making the above-described organic polyisocyanates. The process includes reacting A) one or more organic polyisocyanates with a mean isocyanate functionality of $\geq 1.8$, with B) one or more CH-acidic cyclic ketones of general formula (I) as described above, C) optionally one or more other compounds reactive towards isocyanate groups, and D) optionally in the presence of one or more catalysts. The components are used in proportions such that the equivalent ratio of isocyanate groups in component A) to the sum of the groups reactive towards isocyanate groups in component B) and optionally C) is 0.7 to 1.3.

The present invention is further directed to method of producing plastics that includes reacting the above-described polyisocyanates with a binder having groups reactive towards isocyanates. The invention additionally extends to substrates coated with resulting polyurethane plastics.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

As used herein, the term "functionality" and similar terms refers to the number of functional groups in a molecule. In other words and as a non-limiting example, a molecule with a functionality of greater than one contains more than one functional groups.

It has now been found that solid blocked polyisocyanates which, in combination with conventional powder coating binders, allow for the first time the formulation of powder coatings that cure without elimination at low stoving temperatures of ≦160° C. and do not tend to yellow on overstoving can be prepared by reacting polyisocyanates with CH-acidic cyclic ketones and optionally other compounds reactive towards isocyanate groups.

The invention provides organic polyisocyanates which
a) have a melting range within the temperature range from 40° C. to 125° C., and
b) have NCO groups blocked with one or more CH-acidic cyclic ketones of general formula (I):

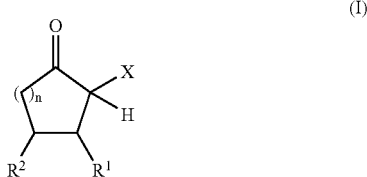

in which
X is an electron-withdrawing group,
$R^1$, $R^2$ independently of one another can be a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and can optionally be substituted by halogen atoms, and
n is an integer from 0 to 5.

The invention also provides a process for the preparation of the organic polyisocyanates according to the invention, wherein
A) an organic polyisocyanate component with a mean isocyanate functionality of ≧1.8,
B) one or more CH-acidic cyclic ketones of general formula (I):

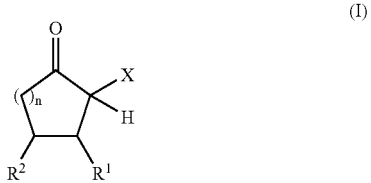

in which
X is an electron-withdrawing group,
$R^1$, $R^2$ independently of one another can be a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and can optionally be substituted by halogen atoms, and
n is an integer from 0 to 5, and
C) optionally one or more other compounds reactive towards isocyanate groups,
D) optionally in the presence of one or more catalysts, are reacted together in proportions such that the equivalent ratio of isocyanate groups in component A) to the sum of the groups' reactive towards isocyanate groups in component B) and optionally C) is 0.7 to 1.3.

Any isocyanate-functional compounds with a mean NCO functionality of ≧1.8 can be used, individually or in any mixtures with one another, as organic polyisocyanates in component A) of the process according to the invention.

Examples of suitable compounds are monomeric diisocyanates and triisocyanates with aliphatically, cycloaliphatically and/or aromatically bonded isocyanate groups, which can be prepared by any process, e.g. by phosgenation or by a phosgene-free route, e.g. by urethane cleavage, especially those in the molecular weight range 140 to 400, such as 1,4-butane diisocyanate, 1,6-diisocyanatohexane (hexamethylene diisocyanate, HDI), 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethylcyclohexane (isophorone diisocyanate, IPDI), 1-isocyanato-1-methyl-4(3)-isocyanatomethylcyclohexane, 4,4'-diisocyanatodicyclohexyl-methane, 1,3-diisocyanato-2(4)-methylcyclohexane, 4-isocyanatomethyl-1,8-octane diisocyanate (triisocyanatononane, TIN), 1,3- or 1,4-phenylene diisocyanate, 2,4- or 2,6-toluylene diisocyanate (TDI), 2,4'- or 4,4'-diphenylmethane diisocyanate and 1,5-naphthylene diisocyanate, or mixtures thereof.

Other suitable organic polyisocyanates for the process according to the invention are polyisocyanates prepared by the modification of said diisocyanates and/or triisocyanates and having a uretdione, isocyanurate, iminooxadiazinetrione, urethane, allophanate, biuret and/or oxadiazinetrione structure, such as those described as examples in e.g. J. Prakt. Chem. 336 (1994) 185–200 or DE-A 1 670 666 and EP-A 798 299.

Other suitable polyisocyanates for use in component A) are NCO-functional prepolymers with a mean NCO functionality of 2.0 to 4.0 and an average molecular weight ($M_n$), calculable from functionality and NCO content, of 350 to 5000, preferably of 400 to 2000 and very particularly preferably of 450 to 1200, such as those obtainable in known manner by reacting the above-mentioned diisocyanates, triisocyanates and/or polyisocyanates with substoichiometric amounts of polyols, especially those in the molecular weight range 62 to 2000.

In principle, any of the polyols disclosed in EP-A 1 063 251, especially polyesterpolyols, are suitable for preparing the prepolymers.

Of course, any of said polyisocyanates and/or NCO prepolymers can be used in the process according to the invention either individually or in any mixtures with one another.

Monoisocyanates can optionally also be used in component A) for adjusting specific properties, for example the functionality or the melt viscosity. Examples of suitable monoisocyanates are butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any mixtures of such monoisocyanates.

If monoisocyanates are used, however, their maximum amounts are such that the mean isocyanate functionality of component A) is at least 1.8, preferably 2.0 to 6.0 and particularly preferably 2.0 to 4.5.

Preferred organic polyisocyanates for the process according to the invention are those of the type described above which have exclusively aliphatically and/or cycloaliphatically bonded NCO groups, optionally in the form of their NCO prepolymers or as polyisocyanates containing uretdione, isocyanurate, iminooxadiazirietrione, urethane, allophanate, biuret and/or oxadiazinetrione groups.

Very particular preference is given to the use of hexamethylene diisocyanate (HDI), isophorone diisocyanate (IPDI), 4,4'-diisocyanatodicyclohexylmethane, their polyisocyanates optionally containing uretdione, isocyanurate, iminooxadiazinetrione, urethane, allophanate, biuret and/or oxadiazinetrione groups, and/or NCO prepolymers based on these diisocyanates.

Compounds of general formula (I):

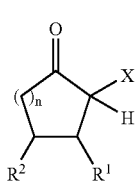

(I)

in which

X is an electron-withdrawing group, $R^1$, $R^2$ independently of one another can be a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and can optionally be substituted by halogen atoms, and n is an integer from 0 to 5, are suitable as CH-acidic cyclic ketones to be used according-to the invention in component B).

The electron-withdrawing group X can be any substituent that leads to a CH acidity of the α-hydrogen by an inductive effect (e.g. I effect) and/or a mesomeric effect (e.g. M effect). These can be e.g. ester groups, sulfoxide groups, sulfone groups, nitro groups, phosphonate groups, nitrile groups, isonitrile groups or carbonyl groups. Nitrile and ester groups are preferred substituents X and carboxylic acid methyl ester and carboxylic acid ethyl ester groups are particularly preferred.

The radicals $R^1$ and $R^2$ are hydrogen, any saturated or unsaturated aliphatic or cycloaliphatic radicals or optionally substituted aromatic or araliphatic radicals, which radicals contain up to 12 carbon atoms and optionally up to 3 heteroatoms selected from the elements oxygen, sulfur and nitrogen, and can optionally be substituted by halogen atoms. The radicals $R^1$ and $R^2$ can also combine with one another and with the carbon atoms of the cyclic ketone, and optionally with another nitrogen atom or an oxygen atom, to form fused rings having 3 to 6 carbon atoms.

The radicals $R^1$ and $R^2$ in the CH-acidic ketones of general formula (I) are preferably hydrogen or saturated aliphatic or cycloaliphatic radicals which can contain up to 6 carbon atoms and optionally up to 3 heteroatoms selected from the elements oxygen, sulfur and nitrogen. Very particularly preferably, the radicals $R^1$ and $R^2$ are hydrogen atoms.

Other suitable, albeit less preferred compounds of general formula (I) are those whose ring optionally contains heteroatoms such as oxygen, sulfur or nitrogen atoms, a lactone or thiolactone structure being preferred.

n in the general formula is preferably an integer from 0 to 5, especially 1 or 2, in which case the cyclic ketones have 5 or 6 carbon atoms in the ring.

Examples of such preferred cyclic ketones are cyclopentanone-2-carboxymethyl ester and carboxyethyl ester, cyclopentanone-2-carbonitrile, cyclohexanone-2-carboxymethyl ester and carboxyethyl ester or cyclopentanone-2-carbonylmethane. Cyclopentanone-2-carboxymethyl ester and carboxyethyl ester and cyclohexanone-2-carboxymethyl ester and carboxyethyl ester are particularly preferred cyclic ketones.

These cyclopentanone systems are technically readily obtainable via a Dieckmann condensation of dimethyl or diethyl adipate. Cyclohexanone-2-carboxymethyl ester is accessible inter alia by hydrogenating methyl salicylate.

Other compounds C) reactive towards isocyanate groups are optionally used in the process according to the invention. These are especially polyols with a number-average molecular weight ($M_n$) of 62–2000 g/mol and a mean functionality preferably of at least 2.0.

Said polyols can be e.g. simple polyhydric alcohols in the molecular weight range 62 to 400, such as 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexanedimethanol or 4,4'-(1-methylethylidene)bis-cyclohexanol, 1,2,3-propanetriol, 1,1,1-trimethylolethane, 1,2,6-hexanetriol, 1,1,1-trimethylolpropane, 2,2-bis(hydroxymethyl)-1,3-propanediol or 1,3,5-tris(2-hydroxyethyl) isocyanurate, as well as simple ester- or ether-alcohols, such as hydroxypivalic acid neopentyl glycol ester, diethylene glycol or dipropylene glycol.

Monoalcohols, such as ethanol, propanol, butanol and their isomers, or diamines, such as Laromin® C 260 (BASF AG, Ludwigshafen, DE), PACM® 20 (Air Products, USA) and Dytek® A (DuPont, USA), are also suitable as other isocyanate-reactive compounds that may be used. Amino alcohols, such as aminoethanol, alkylaminoethanol, tetrakishydroxyethylenediamine or other amino alcohols based on all the known mono-, di- or triamines, are also suitable.

Hydroxycarboxylic acids, such as 2-hydroxypropionic acid, dimethylolpropionic acid, dimethylolbutyric acid, 9,10-dihydroxystearic acid, 4-hydroxybenzoic acid and their isomers, or low-molecular reaction products of 1 mol of trimellitic anhydride with 1 to 2 equivalents of a diol having 2 to 15 C atoms, are also suitable as other isocyanate-reactive compounds that may be used under C). Polyisocyanates modified in this way are particularly suitable as powder coating crosslinking agents for elimination-free matt coatings of the type described in DE-A 3 232 463.

Polyhydroxyl compounds of the polyester, polycarbonate, polyester-carbonate or polyether type, known per se, are also suitable as other isocyanate-reactive compounds that may be used under C).

Examples of polyesterpolyols which can be used are those with an average molecular weight ($M_n$), calculable from functionality and hydroxyl number, of 200 to 2000, preferably of 250 to 1500, and with a hydroxyl group content of 1 to 21 wt. %, preferably of 2 to 18 wt. %, such as those which can be prepared in a manner known per se by reacting polyhydric alcohols, for example those mentioned above in the molecular weight range ($M_n$) 62 to 400, with substoichiometric amounts of polybasic carboxylic acids, corresponding carboxylic anhydrides or corresponding polycarboxylic acid-esters of lower alcohols or lactones.

The acids or acid derivatives used to prepare the polyesterpolyols can be of an aliphatic, cycloaliphatic and/or aromatic nature and can optionally be substituted, e.g. by halogen atoms, and/or unsaturated. Examples of suitable acids are polybasic carboxylic acids in the molecular weight range ($M_n$) 118 to 300, or derivatives thereof, such as succinic acid, adipic acid, sebacic acid, phthalic acid, isophthalic acid, trimellitic acid, phthalic anhydride, tetrahydrophthalic acid, maleic acid, maleic anhydride, dimeric and trimeric fatty acids, dimethyl terephthalate and terephthalic acid bisglycol ester.

The polyesterpolyols can also be prepared using any mixtures of these starting compounds mentioned as examples.

Polyesterpolyols that are preferably to be used as component C) are those which can be prepared in a manner known per se, with ring opening, from lactones and simple polyhydric alcohols, e.g. those mentioned above as examples, as starter molecules. Examples of suitable lactones for the preparation of these polyesterpolyols are β-propiolactone, γ-butyrolactone, γ- and δ-valerolactone, ε-caprolactone, 3,5,5- and 3,3,5-trimethylcaprolactone or any mixtures of such lactones.

Other suitable compounds are polyhydroxyl compounds of the polycarbonate type, especially the polycarbonatediols known per se, such as those which can be prepared e.g. by reacting dihydric alcohols, for example those mentioned above as examples in the list of polyhydric alcohols in the molecular weight range 62 to 400, with diaryl carbonates, such as diphenyl carbonate, or phosgene. Particularly suitable compounds are the diols with ester groups and carbonate groups known per se from e.g. DE-A 1 770 245, which can be obtained by reacting dihydric alcohols with lactones of the type mentioned above as examples, especially ε-caprolactone, and then reacting the resulting polyesterdiols with diphenyl carbonate.

Polyetherpolyols, especially those with an average molecular weight ($M_n$), calculable from functionality and hydroxyl number, of 200 to 2000, preferably of 250 to 1500, and with a hydroxyl group content of 1.7 to 25 wt. %, preferably of 2.2 to 20 wt. %, such as those accessible in a manner known per se by the alkoxylation of suitable starter molecules, are also suitable as other isocyanate-reactive compounds that may be used under C). These polyetherpolyols can be prepared using any polyhydric alcohols, such as those described above in the molecular weight range ($M_n$) 62 to 400, as starter molecules. Alkylene oxides suitable for the alkoxylation reaction are particularly ethylene oxide and propylene oxide, which can be used in the alkoxylation reaction in either order or in a mixture.

Other suitable polyetherpolyols are the polyoxytetramethylene glycols known per se, such as those obtainable e.g. according to Angew. Chem. 72, 927 (1960) by the polymerization of tetrahydrofuran.

Other suitable compounds are so-called dimeric diols, such as those which can be prepared in a manner known per se, e.g. by the hydrogenation of dimeric fatty acids and/or their esters according to DE-A 1 768 313 or other processes described in EP-A 720 994.

Finally, other suitable isocyanate-reactive compounds C) that can optionally be used are the blocking agents with groups reactive towards isocyanate groups, known from polyurethane chemistry, such as diethyl malonate, ethyl acetoacetate, acetone oxime, butanone oxime, ε-caprolactam, 3,5-dimethylpyrazole, 1,2,4-triazole, dimethyl-1,2,4-triazole, imidazole or any mixtures of these blocking agents. If these known blocking agents are used at all, their amounts are such that, in the resulting polyisocyanates blocked with a mixture of blocking agents, at least 30 mol %, preferably at least 50 mol % and particularly preferably at least 70 mol % of the blocked isocyanate groups are blocked with the cyclic ketones from step C) described above.

The preferred compounds to be used as C) in the process according to the invention are the above-mentioned simple polyhydric alcohols in the molecular weight range ($M_n$) 62 to 400, the polyesterpolyols or polycarbonatepolyols mentioned and any mixtures of these polyol components.

The isocyanate-reactive compounds optionally to be used as C) are used in amounts of 0 to 70 wt. %, preferably of 0 to 50 wt. %, based on the total weight of components A, B and C.

In the process according to the invention the reactants A), B) and optionally C) are reacted together in proportions such that the equivalent ratio of isocyanate groups (from A)) to the sum of the groups reactive towards isocyanate groups (from B) and optionally C)) is 0.7 to 1.3, preferably 0.8 to 1.2 and especially 0.9 to 1.1.

In principle, components B) and optionally C) can be reacted with the organic polyisocyanates A) simultaneously or successively in either order.

In the process according to the invention the reaction of components A), B) and optionally C) preferably takes place in the presence of one or more catalysts D), it being possible to use any of the compounds known to those skilled in the art for catalyzing the reaction of isocyanate groups with isocyanate-reactive groups, individually or in any mixtures with one another.

The catalysts used are preferably any of the catalysts known to those skilled in the art for the acceleration of an NCO blocking reaction, e.g. alkali metal and alkaline earth metal bases, such as powdered sodium carbonate (soda) or trisodium phosphate, carbonates or carboxylates of metals of the second subgroup, such as zinc 2-ethylhexanoate, or amines, such as 1,4-diazabicyclo[2.2.2]octane (DABCO), especially sodium carbonate, potassium carbonate or zinc 2-ethylhexanoate.

If one or more other isocyanate-reactive compounds C) are optionally used, it is also possible to add other catalysts D) known per se from polyurethane chemistry, and optionally different from those mentioned above, for increasing the isocyanate reactivity, e.g. tertiary amines, such as triethylamine, pyridine, methylpyridine, benzyldimethylamine, N,N-endoethylenepiperazine, N-methylpiperidine, pentamethyldiethylenetriamine, N,N-dimethylaminocyclohexane and N,N'-dimethylpiperazine, or metal salts, such as iron (III) chloride, zinc chloride, zinc 2-ethylcaproate, tin(II) octoate, tin(II) ethylcaproate, tin(II) palmitate, dibutyltin (IV) dilaurate and molybdenum glycolate, or any mixtures of such catalysts.

It is particularly preferable to use only one catalyst D), especially zinc 2-ethylhexanoate.

Both types of catalyst mentioned above are added in amounts of 0.05 to 10 wt. %, preferably of 0.1 to 3 wt. %, based on the total amount of the starting components A), B) and optionally C).

The polyisocyanates according to the invention are prepared at temperatures of 0° C. to 180° C., preferably of 20° C. to 180° C. and especially of 40 to 140° C. In one very particularly preferred embodiment of the invention, the temperature of 40° C. to 140° C. is chosen so that the reactants A), B) and optionally C) are in the form of a homogeneous melt.

Although less preferable, the reaction can take place in the presence of conventional solvents inert towards isocyanates, such as methylene chloride, butyl acetate, ethylene glycol monomethyl or monoethyl ether acetate, 1-methoxy-2-propyl acetate, 2-butanone, 4-methyl-2-pentanone, cyclohexanone, propylene glycol diacetate, diethylene glycol dimethyl ether, diethylene glycol ethyl or butyl ether acetate, N-methylpyrrolidone and N-methylcaprolactam, toluene or Solvesso® 100 from ExxonMobil Chemical, USA, and mixtures thereof with one another.

If the preparation is carried out in solution, the solids content of the dissolved reactants in the process is typically adjusted to 10 to 90 wt. %.

After the reactants A), B), optionally C) and optionally D) have reacted, any solvents used are separated off by suitable methods, examples being vacuum drying, spray drying or steam-stripping extrusion.

The polyisocyanates according to the invention can be prepared either continuously in a static mixer, an intimate mixer or an extruder, or, preferably, batchwise in a batch reactor.

Independently of the type of preparation, the resulting products according to the invention are blocked polyisocyanates whose melting range is within the temperature range that includes the limits from 40° C. to 125° C., preferably from 40 to 110° C. and especially from 50 to 100° C. The products according to the invention preferably also have a glass transition temperature $T_g$, determined by differential thermal analysis (DTA), of 30 to 80° C., preferably of 40 to 70° C.

The blocked polyisocyanates according to the invention represent valuable starting materials for the production of polyurethane plastics. They are used in particular as crosslinking components in thermosetting elimination-free PUR powder coatings.

Suitable co-reactants for the polyaddition compounds according to the invention are basically any binders known from powder coating technology which have groups reactive towards isocyanates, e.g. hydroxyl, carboxyl, amino, thiol, urethane or urea groups. However, it is preferable to use powder coating binders that are solid below 40° C. and liquid above 130° C. Examples of such powder coating binders are hydroxy-functional polyesters, polyacrylates or polyurethanes, such as those described in the publications of the state of the art cited above, e.g. in EP-A 45 998, or in EP-A 254 152, as well as any mixtures of such resins.

For the preparation of a ready-to-use powder coating, the elimination-free blocked polyisocyanates according to the invention are mixed with suitable powder coating binders, optionally treated with other auxiliary substances and additives, such as catalysts, pigments, fillers or flow control agents, and combined to form a homogeneous material, for example in extruders or kneaders, above the melting range of the individual components, e.g. at 70 to 130° C., preferably at 70 to 110° C.

The blocked polyisocyanates according to the invention and the hydroxy-functional binders are used in proportions such that there are 0.6 to 1.4, preferably 0.8 to 1.2, blocked isocyanate groups per hydroxyl group.

The curing can be accelerated by using catalysts already described above in the process according to the invention for the preparation of the blocked polyisocyanates, e.g. DBTL (dibutyltin dilaurate), zinc 2-ethylhexanoate and bismuth 2-ethylhexanoate. Zinc 2-ethylhexanoate and bismuth 2-ethylhexanoate are preferred catalysts. These catalysts are optionally used in amounts of 0.001 to 2.0 wt. %, preferably of 0.01 to 0.5 wt. %, based on the total amount of ready-to-use powder coating. It is also possible to add other compounds known from polyurethane chemistry, e.g. 1,5-diazabicyclo[4.3.0]non-5-ene (DBN), 1,8-diazabicyclo[5.4.0]undec-7-ene (DBU) and 1,2-dimethyltetrahydropyrimidine, or tertiary amines, such as triethylamine, pyridine, methylpyridine, benzyldimethylamine, N,N-endoethylenepiperazine, N-methylpiperidine, pentamethyldiethylenetriamine, N,N-dimethylaminocyclohexane and N,N'-dimethylpiperazine, or metal salts, such as iron(III) chloride, zinc chloride, zinc 2-ethylcaproate, tin(II) octoate, tin(II) ethylcaproate, tin(II) palmitate and molybdenum glycolate, in amounts of 0.001 to 2.0 wt. %, preferably of 0.01 to 1.0 wt. %, based on the total amount of ready-to-use powder coating.

The solid that results after cooling of the melt is then ground and particle fractions above the desired particle size, for example above 0.1 mm, are removed by sieving.

The ready-to-spray powder coating prepared in this way can be applied by conventional powder application processes, e.g. electrostatic powder spraying or whirl sintering, to the substrates to be coated. According to the invention, any substrates, for example those made of metals, wood or glass, can be coated.

The coatings are cured by heating at temperatures of 110 to 220° C., preferably of 130 to 180° C. and particularly preferably of 140 to 160° C., over a period of 1 to 60 min, preferably of 10 to 30 minutes.

This gives hard elastic coatings with good solvent and chemical resistance that are distinguished by good flow properties and high gloss.

EXAMPLES

The NCO content was determined by titration according to DIN 53 185.

The glass transition temperature $T_g$ was determined with a differential scanning calorimeter (type: DSC 12E, Mettler-Toledo GmbH, D-35353 Giessen) over a temperature range of −15° C. to +100° C. (heating rate: 10 K/minute).

The indicated melting ranges in ° C. were determined with a capillary melting point apparatus (type: Büchi 530, Büchi Labortechnik AG, CH-9230 Flawil).

The catalyst used was Zn(2-ethylhexanoate)$_2$ (Octasoligen® zinc from Borchers GmbH, D-40765 Monheim).

The residual monomer content was determined on a gas chromatograph (type: HP 5890 series II, Hewlett Packard, USA).

Room temperature is understood as meaning 23±3° C.

Unless indicated otherwise, all percentages are by weight (wt. %).

IPDI uretdione was prepared according to U.S. Pat. No. 4,912,210 by the dimethylaminopyridine-catalyzed dimerization of IPDI; NCO content=16.2%; monomeric IPDI<0.5%.

TMP: trimethylolpropane

Example 1

Preparation in Solution of a Powder Coating Crosslinking Agent Based on IPDI Uretdione 139.5 g of IPDI uretdione (NCO content: 16.2%; monomeric IPDI<0.5%) were dissolved in 52 mg of methylene chloride under nitrogen at room temperature. 63.5 g of cyclopentanone-2-carboxyethyl ester and 6 g of trimethylolpropane (TMP) were added to the homogeneous solution. The mixture was stirred for 30 min. Finally, 0.4 g of catalyst was added and the temperature rose slightly. When the temperature had stopped rising, the reaction mixture was heated to 40° C. and stirred at this temperature until the NCO content had dropped below 0.8%. When the reaction was complete, the solvent was removed at 50° C. under vacuum (1 mbar).

This gave a colourless powder with a free NCO content of 0.5%, a $T_g$ of 52° C. and a melting range of 74° C. to 80° C.

Example 2

Preparation in the Melt of a Powder Coating Crosslinking Agent Based on IPDI Uretdione 171.0 g of IPDI uretdione and 0.5 g of catalyst were heated to 80° C. in a flat boat reactor under nitrogen. A solution of 78.0 g of cyclopentanone-2-carboxyethyl ester and 7.1 g of TMP was added dropwise to the melt, with vigorous stirring, so that the temperature of the reaction mixture was between 100° C. and 120° C. When the addition had ended, the mixture was stirred at 120° C. until the NCO content was less than 1.5%. The melt was then poured onto a metal sheet to solidify. The pale yellow solid resin obtained after cooling had a content of free NCO groups of 1.2% and a Tg of 41° C.

Example 3

Preparation of a Powder Coating Crosslinking Agent Based on IPDI Trimer 174.1 g of Desmodur® Z 4470 BA (IPDI trimer; 70% in butyl acetate; NCO content: 11.7%; monomeric IPDI<0.5%, Bayer AG, DE) and 75.7 g of cyclopentanone-2-carboxyethyl ester were brought together at room temperature under nitrogen and stirred briefly to form a homogeneous solution. 0.5 g of catalyst was then added. When the exothermicity had subsided, the reaction mixture was heated to 40° C. and stirred at this temperature until the NCO content was less than 0.5%. The solvent was then removed at 50° C. under vacuum (1 mbar).

This gave a colourless powder with a content of free NCO groups of 0.5%, a Tg of 60° C. and a melting range of 70° C. to 100° C.

Example 4

Preparation of a Powder Coating Crosslinking Agent Based on Monomeric IPDI 86.2 g of Desmodur® I (monomeric IPDI; NCO content: 37.5%, Bayer AG, DE), 10.4 g of TMP and 78 g of methylene chloride were brought together and mixed at 40° C. under nitrogen. 0.36 g of catalyst was then added. 84.7 g of cyclopentanone-2-carboxyethyl ester were then added dropwise to the reaction mixture. When the addition had ended, the reaction mixture was stirred at 40° C. until the NCO content was less than 0.5%. When the reaction was complete, the solvent was removed at 50° C. under vacuum (1 mbar).

This gave a colourless powder with a content of free NCO groups of 0%, a $T_g$ of 41° C. and a melting range of 60° C. to 70° C.

Example 5

Preparation of a Powder Coating Crosslinking Agent by the Chain Extension of a Partially Blocked Isocyanate 111 g of Desmodur® I (monomeric IPDI; NCO content: 37.5%, Bayer AG, DE), 78.1 g of cyclopentanone-2-carboxyethyl ester and 0.4 g of catalyst were stirred together at room temperature under nitrogen until the NCO content had reached the theoretical value of 11%. 37.8 g of the partially blocked isocyanate obtained were then dissolved in 46.8 g of butyl acetate and heated to 80° C. 8.9 g of TMP were added in portions and the mixture was stirred at 80° C. for 3 hours until the NCO content was less than 0.5%. When the chain extension was complete, the solvent was removed at 60° C. under vacuum (1 mbar).

This gave a colourless powder with a content of free NCO groups of 0% and a $T_g$ of 36° C.

Example 6

Preparation in the Melt of a Powder Coating Crosslinking Agent Based on IPDI Uretdione 173.0 g of IPDI uretdione and 0.5 g of catalyst were heated to 80° C. in a flat boat reactor under nitrogen. A solution of 71.0 g of cyclopentanone-2-carboxyethyl ester and 11.5 g of 1,6-hexanediol was added dropwise to the melt, with vigorous stirring, so that the temperature of the reaction mixture was between 100° C. and 120° C. When the addition had ended, the mixture was stirred at 110° C. for a further 4 hours. The melt was then poured onto a metal sheet to solidify. The pale yellow solid resin obtained after cooling had a content of free NCO groups of 2.5% and a Tg of 33° C.

Example 7

Synthesis of a Polycaprolactonediol 901 g of 1,4-butanediol and 1712 g of ε-caprolactone were mixed at room temperature under dry nitrogen, 0.3 g of catalyst was added and the mixture was then heated at 160° C. for 5 h. The colourless liquid product obtained after cooling to room temperature had a viscosity of 180 mPas (23° C.) and an OH number of 416 mg KOH/g.

Preparation of a Powder Coating Crosslinking Agent Based on IPDI Uretdione and Polycaprolactonediol 170.0 g of IPDI uretdione, 40.0 g of polycaprolactonediol, 50.0 g of cyclopentanone-2-carboxyethyl ester and 112.0 g of methylene chloride were premixed at 40° C. under nitrogen. 0.5 g of catalyst was added to the homogeneous mixture. The reaction mixture was then stirred at 40° C. for 12 hours. Finally, the solvent was removed at 50° C. under vacuum (1 mbar). The colourless powder obtained had a content of free NCO groups of 0%, a $T_g$ of 59° C. and a melting range of 68° C. to 94° C.

Example 8

Preparation in the Melt of a Powder Coating Crosslinking Agent Based on Desmodur® W 144.0 g of Desmodur® W (4,4'-methylenebis(cyclohexyl isocyanate); NCO content: 31.8%, Bayer AG, DE) and 0.25 g of catalyst were heated to 80° C. in a flat boat reactor under nitrogen. A solution of 86.0 g of cyclopentanone-2-carboxyethyl ester and 24.0 g of TMP was added to the melt, with vigorous stirring, so that the temperature of the reaction mixture was between 100° C. and 120° C. When the addition had ended, the mixture was stirred at 120° C. for a further 6 hours. The melt was then poured onto a metal sheet to solidify. The pale yellow solid resin obtained after cooling had a content of free NCO groups of 1.8%, a Tg of 33° C. and a melting range of 53° C. to 73° C.

Example 9

The dimerization catalyst trihexyltetradecylphosphonium 1,2,4-triazolate was prepared from sodium methylate and trihexyltetradecylphosphonium chloride (Cyphos® 3653, Cytec Industries, DE) by methods known in the literature (e.g. DE-A 101 234 16).

Dimerization of Desmodur® W 12 g of the dimerization catalyst trihexyltetradecylphosphonium 1,2,4-triazolate were continuously added dropwise over a reaction time of 3 hours, at 30° C. under nitrogen, to 1000 g of Desmodur® W. After a subsequent stirring time of 30 min, the NCO content of the reaction mixture was 26.2%, corresponding to a degree of oligomerization of 17.1%. The catalyst was then deactivated by the addition of 4.6 g of dibutyl phosphate, and excess diisocyanate was separated from the resulting clear colourless mixture by means of a film evaporator at a temperature of 155° C. and a pressure of 0.2 mbar. This gave a highly viscous and almost colourless uretdione polyisocyanate with a content of free NCO groups of 16% and a content of monomeric isocyanate of 0.5%.

Preparation of a Powder Coating Crosslinking Agent Based on Desmodur® W Uretdione 107.0 g of the Desmodur® W uretdione prepared above, 4.5 g of TMP and 41.5 g of methylene chloride were brought together at 40° C. under nitrogen and stirred until the NCO content had dropped to approx. 8.5%. 0.3 g of catalyst and 48.0 g of cyclopentanone-2-carboxyethyl ester were then added. When the addition had ended, the reaction mixture was stirred for 24 hours at 40° C. After removal of the solvent at 50° C. under vacuum (1 mbar), the colourless powder obtained had a content of free NCO groups of 0.6%, a Tg of 28° C. and a melting range of 55° C. to 100° C.

Example 10

Use of the Powder Coating Crosslinking Agents in Pigmented Powder Coatings

The individual components shown in Table 1 were brought together, stirred for 30 min at 2000 rpm with a mixer (Prism Pilot 3, ThermoPRISM, GB) and then homogenized at 150 rpm by means of an extruder (Buss PLK 46, Cooperion Buss AG, CH) at a housing temperature of 100° C./120° C./150° C. The solidified homogenized melt obtained after cooling was ground in a classifier mill (ACM II, 90 µm sieve, Hokosawa, JP) and applied to a degreased steel sheet with a cup gun (Corona EPS from Wagner, DE) at a high voltage of 70 kV. The coated sheets were then stoved for 30 min at temperatures of 140–170° C. in a gradient furnace. The following properties were determined on the cured films: Gardner gloss (20°/60°) according to DIN 67 530, Erichsen deep drawing according to DIN EN ISO 1520 and acetone resistance (50 double strokes with an acetone-impregnated wad of cotton wool; 0: no change, 1: film slightly scratchable, 2: film soft; sm: film slightly matt, m: film matt).

TABLE 1

Formulations of pigmented powder coatings

| Component | 10-A | 10-B | 10-C | 10-D | 10-E |
|---|---|---|---|---|---|
| from Example 1 | 8.2% | | | | |
| from Example 2 | | 8.2% | | | |
| from Example 6 | | | 8.2% | | |
| from Example 7 | | | | 9.0% | |
| from Example 9 | | | | | 9.5% |
| Rucote 194[1] | 54.8% | 54.8% | 54.8% | 54.0% | 53.0% |
| Resiflow PV 88[2] | 1.0% | 1.0% | 1.0% | 1.0% | 1.5% |
| Catalyst | 0.5% | 0.5% | 0.5% | 0.5% | 0.5% |
| Benzoin | 0.5% | 0.5% | 0.5% | 0.5% | 0.5% |
| Kronos 2160[3] | 35.0% | 35.0% | 35.0% | 35.0% | 35.0% |

[1]polyesterpolyol, Bayer AG, DE, OH = 42–47 mg KOH/g
[2]flow control agent, Worlée-Chemie GmbH, DE
[3]white pigment, Kronos Titan GmbH, DE

TABLE 2

Technical surface coating properties of the pigmented powder coatings

| Parameter | 10-A | 10-B | 10-C | 10-D | 10-E |
|---|---|---|---|---|---|
| Layer thickness [µm] | 68–81 | 77–82 | 66–75 | 61–65 | 63–78 |
| Gardner gloss 20°/60° | | | | | |
| 30 min at 140° C. | 89/92 | 87/95 | — | — | — |
| 30 min at 150° C. | 85/94 | 86/94 | 87/95 | 85/94 | 41/88 |
| 30 min at 160° C. | 84/93 | 85/94 | 85/95 | 84/93 | 49/90 |
| 30 min at 170° C. | 83/93 | 82/93 | 84/94 | 84/94 | 56/91 |
| Erichsen deep drawing [mm] | | | | | |
| 30 min at 140° C. | 0.3 | 0.3 | — | — | — |
| 30 min at 150° C. | 0.4 | 0.3 | <1 | <1 | <1 |
| 30 min at 160° C. | 0.7 | 0.4 | >9 | >9 | <1 |
| 30 min at 170° C. | >9 | >9 | >9 | >9 | 8.5 |
| Acetone resistance | | | | | |
| 30 min at 140° C. | −7* | −7* | — | — | — |
| 30 min at 150° C. | 2 m | 2 m | −20* | −12* | −16* |
| 30 min at 160° C. | 2 m | 2 m | 1 m | 2 m | 1 |
| 30 min at 170° C. | 2 m | 2 m | 1 sm | 2 sm | 1 |

*The film separated after the indicated number of double strokes.

Example 11

Use of the Powder Coating Crosslinking Agents in Powder Varnishes

The varnish formulations were prepared, processed, stoved and tested analogously to the formulations from Example 10.

TABLE 3

Formulation of powder varnishes

| Component | |
|---|---|
| Crosslinking agent from Example 2 | 12.8% |
| Rucote 194[4] | 85.4% |
| Acronal 4F[5] | 1.0% |
| Catalyst | 0.5% |
| Benzoin | 0.3% |

[4]polyesterpolyol, Bayer AG, DE, OH = 42–47 mg KOH/g
[5]flow control agent, BASF AG, DE

TABLE 4

Technical surface coating properties of the powder varnish

| Layer thickness [μm] | 65–78 |
|---|---|
| Gardner gloss 20°/60° | |
| 30 min at 140° C. | 105/114 |
| 30 min at 150° C. | 103/112 |
| 30 min at 160° C. | 102/112 |
| 30 min at 170° C. | 94/106 |
| Erichsen deep drawing [mm] | |
| 30 min at 140° C. | 0.3 |
| 30 min at 150° C. | 0.3 |
| 30 min at 160° C. | >9.0 |
| 30 min at 170° C. | >9.0 |
| Acetone resistance | |
| 30 min at 140° C. | –12* |
| 30 min at 150° C. | 2 m |
| 30 min at 160° C. | 1 sm |
| 30 min at 170° C. | 1 sm |

*The film separated after the indicated number of double strokes.

Example 12

Use of the Powder Coating Crosslinking Agents in Thick Layer Applications

The powder coating formulation of Example 9-E was applied to a wedge-shaped metal sheet and stoved at 170° C. for 20 minutes. No bubbles were observed up to a layer thickness of 120 μm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Organic polyisocyanates which
   a) have a melting range within the temperature range of from 40° C. to 125° C., and
   b) have NCO groups blocked with one or more CH-acidic cyclic ketones of general formula (I):

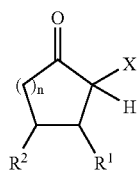

(I)

in which
X is an electron-withdrawing group,
$R^1$, and $R^2$ independently of one another are a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and are optionally substituted by halogen atoms, and
n is an integer from 0 to 5.

2. The polyisocyanates according to claim 1, wherein the polyisocyanates are based on polyisocyanates having exclusively aliphatically and/or cycloaliphatically bonded isocyanate groups and optionally containing uretdione, isocyanurate, iminooxadiazinetrione, urethane, allophanate, biuret and/or oxadiazinetrione groups.

3. The polyisocyanates according to claim 1, wherein the electron-withdrawing group X of the CH-acidic cyclic ketone is selected from the group consisting of ester, sulfoxide, sulfone, nitro, phosphonate, nitrile, isonitrile and carbonyl group.

4. A process for the preparation of organic polyisocyanates according to claim 1 comprising reacting
   A) one or more organic polyisocyanates with a mean isocyanate functionality of ≧1.8, with
   B) one or more CH-acidic cyclic ketones of general formula (I):

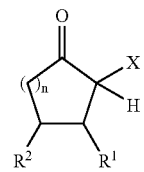

(I)

in which
X is an electron-withdrawing group,
$R^1$, $R^2$ independently of one another are a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and are optionally substituted by halogen atoms, and
n is an integer from 0 to 5, and
   C) optionally one or more other compounds reactive towards isocyanate groups, and
   D) optionally in the presence of one or more catalysts,
in proportions such that the equivalent ratio of isocyanate groups in component A) to the sum of the groups reactive towards isocyanate groups in component B) and optionally C) is 0.7 to 1.3.

5. The process according to claim 4 wherein organic polyisocyanates having exclusively aliphatically and/or cycloaliphatically bonded isocyanate groups and optionally containing uretdione, isocyanurate, iminooxadiazinetrione, urethane, allophanate, biuret and/or oxadiazinetrione groups are used as the polyisocyanates A).

6. The process according to claim 4, wherein the electron-withdrawing group X of the CH-acidic cyclic ketone is selected from the group consisting of an ester, sulfoxide, sulfone, nitro, phosphonate, nitrile, isonitrile and carbonyl group.

7. The process according to claim 4, wherein polyols with a molecular weight ($M_n$) of 62–2000 g/mol and a mean OH functionality of at least 2.0 are used as the isocyanate-reactive compounds C).

8. A method of producing plastics comprising reacting the polyisocyanates according to claim 1 with a binder having groups reactive towards isocyanates.

9. Substrates coated with plastics according to claim 8.

10. The process of claim 4, wherein the polyisocyanates of A) are one or more selected from the group consisting of 1,4-butane diisocyanate, hexamethylene diisocyanate, 1,5-diisocyanato-2,2-dimethylpentane, 2,2,4-trimethyl-1,6-diisocyanatohexane, 2,4,4-trimethyl-1,6-diisocyanatohexane, 1,10-diisocyanatodecane, 1,3-diisocyanatocyclohexane and 1,4-diisocyanatocyclohexane, isophorone diisocyanate, 1-isocyanato-1-methyl-4(3)-isocyanatomethylcyclohexane, 4,4'-diisocyanatodicyclohexyl-methane, 1,3-diisocyanato-2(4)-methylcyclohexane, triisocyanatononane, 1,3-phenylene diisocyanate, 1,4-phenylene diisocyanate, 2,4-toluylene diisocyanate, 2,6-toluylene diisocyanate, 2,4'-diphenylmethane diisocyanate, 4,4'-diphenylmethane diisocyanate, 1,5-naphthylene diisocyanate, and mixtures thereof.

11. The process of claim 4, wherein the catalyst D) is selected from the group consisting of dibutyltin dilaurate, zinc 2-ethylhexanoate, bismuth 2-ethylhexanoate and mixtures thereof.

12. The process of claim 4, wherein the CH-acidic cyclic ketones are selected from the group consisting of cyclopentanone-2-carboxymethyl ester, cyclopentanone-2-carboxyethyl ester, cyclopentanone-2-carbonitrile, cyclohexanone-2-carboxymethyl ester, cyclohexanone-2-carboxyethyl ester, cyclopentanone-2-carbonylmethane and mixtures thereof.

* * * * *